(12) United States Patent
So et al.

(10) Patent No.: US 11,607,917 B2
(45) Date of Patent: Mar. 21, 2023

(54) TIRE SENSOR INSTALLATION STRUCTURE AND MANUFACTURING METHOD THEREOF

(71) Applicant: Hankook Tire Co., Ltd., Seoul (KR)

(72) Inventors: Soon Hong So, Daejeon (KR); Jeong Heon Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 199 days.

(21) Appl. No.: 16/920,628

(22) Filed: Jul. 3, 2020

(65) Prior Publication Data

US 2020/0331304 A1    Oct. 22, 2020

Related U.S. Application Data

(63) Continuation of application No. 15/351,158, filed on Nov. 14, 2016, now Pat. No. 10,737,538.

(30) Foreign Application Priority Data

Nov. 13, 2015   (KR) .......................... 10-2015-0159878

(51) Int. Cl.
*B60C 23/04*        (2006.01)
*B29D 30/06*        (2006.01)
(Continued)

(52) U.S. Cl.
CPC .......... *B60C 19/00* (2013.01); *B29D 30/0061* (2013.01); *B60C 5/14* (2013.01);
(Continued)

(58) Field of Classification Search
CPC ............................................. B29D 2030/0072
See application file for complete search history.

(56) References Cited

U.S. PATENT DOCUMENTS 6,518,877 B1    2/2003    Starkey et al.
2004/0226643 A1*  11/2004  Yagi ...................... B60C 1/0008
                                                    152/510
(Continued)

FOREIGN PATENT DOCUMENTS

DE       102006004707 A1    9/2006
DE       102005024256 A1   11/2006
(Continued)

OTHER PUBLICATIONS

Office Action dated Jan. 17, 2017 in Korean Application No. 1020150159878 ; 7 pages.

*Primary Examiner* — Kendra Ly
(74) *Attorney, Agent, or Firm* — Knobbe, Martens, Olson & Bear, LLP

(57) ABSTRACT

The disclosed technology generally relates to an installation structure for installing a sensor module, and more particularly relates to an installation structure for installing a sensor module on a tire, and to a method of manufacturing the installation structure. In one aspect, the installation structure includes a sensor module housing configured to accommodate a sensor module and at least one sensor patch each comprising a bonding portion configured to attach to an inner side of a tire and a pressing portion configured to place and maintain the sensor module housing in contact with an installation position on the inner side of the tire. The pressing portion is configured to apply a downward pressure on a top portion of the sensor module housing by elastically extending and contracting.

16 Claims, 13 Drawing Sheets

(51) Int. Cl.
    *B60C 19/00*         (2006.01)
    *B29D 30/00*         (2006.01)
    *B60C 5/14*          (2006.01)

(52) U.S. Cl.
    CPC .. *B60C 23/0493* (2013.01); *B29D 2030/0072* (2013.01); *B29D 2030/0083* (2013.01)

(56) References Cited

U.S. PATENT DOCUMENTS

| | | |
|---|---|---|
| 2006/0201241 A1 | 9/2006 | Durif |
| 2009/0218459 A1 | 9/2009 | Durif |
| 2014/0261944 A1* | 9/2014 | Papakonstantopoulos ................... B65D 85/06 206/524.1 |

FOREIGN PATENT DOCUMENTS

| | | |
|---|---|---|
| DE | 102006027918 A1 | 12/2007 |
| DE | 102007008043 A1 | 8/2008 |
| JP | 2007-513820 | 5/2007 |
| JP | 2007-331293 | 12/2007 |

\* cited by examiner

TIRE SENSOR INSTALLATION STRUCTURE AND MANUFACTURING METHOD THEREOF

CROSS-REFERENCE TO RELATED APPLICATIONS

This application is a continuation of U.S. patent application Ser. No. 15/351,158, filed Nov. 14, 2016, which claims foreign priority to Korean Patent Application No. 10-2015-0159878, filed on Nov. 13, 2015. The disclosure of each of these applications is incorporated herein by reference in its entirety.

BACKGROUND

Field

The disclosed technology generally relates to an installation structure for installing a sensor module, and more particularly relates to an installation structure for installing a sensor module on a tire, and to a method of manufacturing the installation structure.

Description of the Related Technology

Recently, a system that provides various items of information to a driver by processing data such as internal air pressure, temperature, and acceleration of tires collected by sensor modules installed in the tires has been developed and commonly used.

Tires are rotated at high speeds and rapidly accelerated and decelerated while vehicles are driven, so when a sensor module is arranged in the tires, it is exposed to lateral force in various directions and rotational moment etc. under these conditions. Accordingly, structures for firmly and reliably install sensor module in a tire have been developed.

Various methods of attaching sensor module to tiers have been developed, and for example, as for a bonding type that uses an adhesive, the attachment ability is necessarily deteriorated by heat that is generated in a tire while vehicle runs. Further, when sensors are attached to the material of a tire such as a bead and a rim, attachment is not stable, so it may be a factor that threatens the safety of passengers, and the parts of the sensors may be damaged when the tire is mounted and separated.

In US Patent Application Publication No. 2001-870569 (titled, "pneumatic tire monitor, hereafter, referred to as Patent Document 1), there has been disclosed a system for monitoring a pneumatic tire that includes a tire, a transponder arranged on the tire and having an antenna, one or more receivers fixed to a vehicle, and a processor for processing received signals, in which the circuit of the transponder is formed on a printed circuit board and accommodated in a protective housing coaxially arranged with a wheel hub shaft and the antenna is one of small coupling coils adjacent to a partial loop antenna, a spiral antenna, a circular dipole antenna, and an infinite loop antenna.

SUMMARY OF CERTAIN INVENTIVE ASPECTS

Patent Document 1 has a first problem in that when the circuit board is fixed to a wheel hub shaft by specific support structures and mechanical elements, the mechanical elements are likely to be separated due to various types and magnitudes of vibrations and shocks that are generated while a tire is rotated, a second problem in that the circuit board is arranged only on the wheel hub shaft, so sensor module cannot be arranged at various positions in the tire, and a third problem in that sensors that sense wear etc. cannot be used.

In various embodiments, the installation structure includes one or more sensor patches. Each sensor path is made of an elastic material and has a bonding portion for coupling to the inner side of a tire and a pressing portion for bringing a sensor module housing in close contact with an installation position. The installation structure provides advantages of conveniently mounting and separating a sensor module, being applicable to various sensors and various positions, and improving reliability of mounting the sensor module, among other advantages.

In order to solve the problems, in one aspect, a sensor installation structure includes: a sensor module housing accommodating the sensor module; and one or more sensor patch having a bonding portion that is attached to the inner side of a tire and a pressing portion that brings and maintains the sensor module housing in close contact with an installation position, in which the pressing portion presses down the top of the sensor module housing by extending and contracting.

The sensor module housing may have a fixing projection having a predetermined shape on the top, the sensor patch may have a fixing hole in which the fixing projection is inserted, and the fixing hole and the fixing projection may be fitted to each other to prevent the sensor module housing from laterally separating out of the installation position.

The sensor patch may be a rectangular or elliptical band and the bonding portion may be formed at both sides of the band.

Two or more sensor patches may be provided and the two or more sensor patches may be arranged across each other and the pressing portions are all arranged over the installation position.

The sensor patch may be formed in the shape of any one of a circle, an ellipse, and a polygon, the bonding portion may be formed with a predetermined width around the entire or a portion of the edge of the sensor patch, a sensor insertion hole that is expanded and then restored to the initial size, after the sensor module housing is inserted, may be formed at a predetermined position of the pressing portion, and the sensor module housing may be fixed in a space defined by the sensor patch and the inner side of the tire.

A fixing projection having a predetermined shape may be formed on the top of the sensor module housing, and the sensor insertion hole may be fitted on the fixing projection and may prevent the sensor module housing from laterally separating out of the installation position.

The material of the sensor patch may be at least one or more homopolymers selected from a group of EVA (Ethylene vinyl acetate), synthetic resin, natural resin, and urethane, or copolymers of monomers of them.

The structure may be formed on an inner liner of a tire.

The sensor patch may have thickness of 20~120% of the thickness of the inner liner.

The sensor patch may be made of the same material as the inner liner.

The bonding portion and the inner side of the tire may be combined by a bonding process or a fusing process.

The bonding portion and the inner side of the tire may be combined by vulcanization, and an anti-pressing portion-tire attachment structure may be provided under the pressing portion before vulcanization in order to prevent the surface of the pressing portion and the inner side of the tire from being attached to each other in the vulcanization.

The anti-pressing portion-tire attachment structure may be made of a high-temperature polymer that is not melted at a temperature for vulcanization.

The anti-pressing portion-tire attachment structure may have thickness that is 20 to 50% of the thickness of the sensor patch.

The anti-pressing portion-tire attachment structure may have an ejector that can be held with a hand to easily remove the anti-pressing portion-tire attachment structure.

In another aspect, a method of using the tire sensor installation structure includes: extending upward the sensor patch by applying force to the pressing portion; putting the sensor module housing under the pressing portion; fitting the fixing hole onto the fixing projection; removing the force extending the sensor patch so that the sensor patch contracts and presses down the sensor module housing; and maintaining the sensor module housing in close contact with the inner side of the tire using the sensor patch.

The method may further include applying a temporal or permanent adhesive to a portion of the sensor patch before the extending upward the sensor patch by applying force to the pressing portion.

In yet another aspect, a method of using the tire sensor installation structure includes: forcibly expanding the sensor insertion hole; inserting the sensor module housing through the expanded sensor insertion hole; removing the force expanding the sensor insertion hole so that the sensor patch contracts and the pressing portion presses down the sensor module housing; and maintaining the sensor module housing in close contact with the inner side of the tire using the sensor patch.

The tire may include one or a plurality of tire sensor installation structures.

DETAILED DESCRIPTION OF CERTAIN ILLUSTRATIVE EMBODIMENTS

Figure 1:
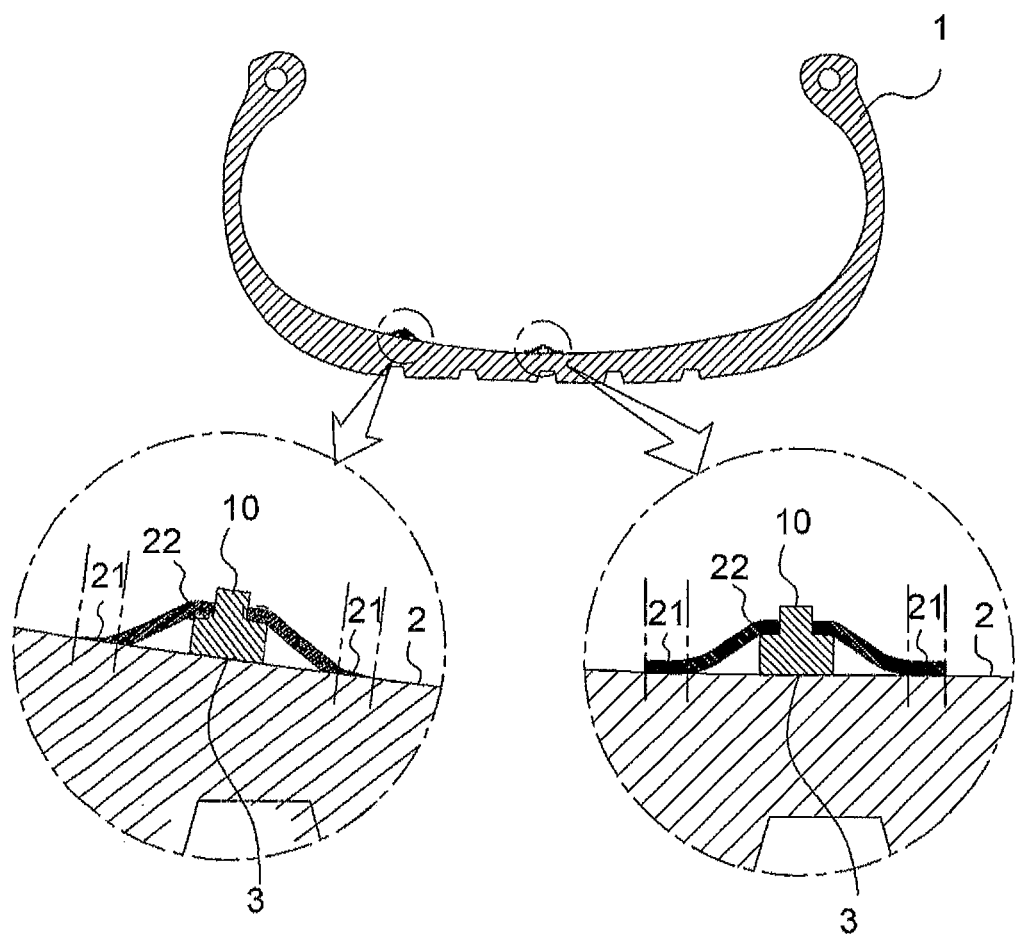
FIG. 1 is a cross-sectional view of a tire sensor installation structure according to various embodiments, including a band type and a type having a sensor insertion hole.

The present invention may be modified in various ways and implemented by various exemplary embodiments, so that specific exemplary embodiments are shown in the drawings and will be described in detail. However, it is to be understood that the present invention is not limited to the specific exemplary embodiments, but includes all modifications, equivalents, and substitutions included in the spirit and the scope of the present invention. Like reference numerals are given to like components in the description of the drawings.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. As used herein, the singular forms are intended to include the plural forms as well, unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, exemplary embodiments of the present disclosure will be described in more detail with reference to the accompanying drawings. The same components are given the same reference numerals in the drawings and repeated description is not provided for the same components.

The present disclosure relates to a sensor installation structure for installing a sensor module collecting data about the states of a tire at an installation position 3 on the inner side of the tire and the structure largely includes a sensor module housing 10 accommodating a sensor module and one or more sensor patch 20 having a function of bringing and keeping the sensor module housing 10 in contact with the installation position 3.

Hereinafter, each component will be described.

The sensor module housing 10 has a first function of accommodating a sensor module, a second function of having a shape with a top pressed down by a sensor patch 20 to be described below, and a third function of having a specific structure for preventing the sensor module housing 10 separating from the installation position 3 by enhancing the combination of the sensor patch 20 and the sensor module housing 10.

In the present disclosure, the sensor module includes one or more sensor devices and a board mounted with the sensor devices and may include a communication device and an antenna for receiving signals from an external controller or transmitting data about the inside of a tire/a road surface collected by the sensor devices. The information that the sensor devices collect may include the internal temperature and internal pressure of a tire, the state of a road surface, the degree of wear at predetermined portions of a tire, the driving states of a vehicle, and the longitudinal and lateral acceleration of a tire, but it not limited thereto.

Figure 2:
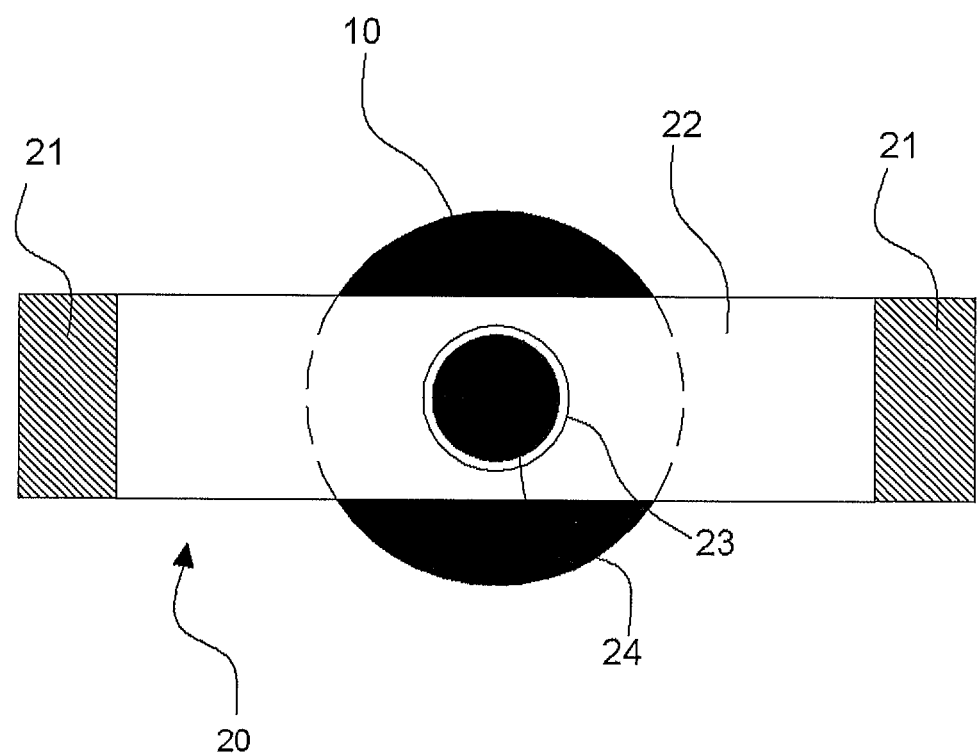
FIG. 2 is a plan view illustration of a tire sensor installation structure according to embodiments.

FIG. 1 is a cross-sectional view of a tire sensor installation structure according to various embodiments, including a band type and a type having a sensor insertion hole. FIG. 2 is a plan view illustration of a tire sensor installation structure according to embodiments. In the illustrated embodiments, the sensor housing 10 has a structure configured to firmly hold a sensor module therein and the shape of the bottom of the sensor module may have a suitable shape, including, e.g., a rectangle (square), a polygon, a circle, and an ellipse, among other shapes. Further, in the illustrated embodiment, the sensor housing 10 has a top portion that is configured to resist a downward pressure from the sensor patch 20 as described herein and elsewhere in this specification, and the top portion has the same shape as the bottom portion. However, other embodiments are possible, e.g., the bottom portion of the sensor housing 10 may be designed to be larger in area than the top portion in order to be stably brought in close contact with the inner side of a tire.

Further, the sensor module housing 10 may further have a structure configured to prevent the sensor module housing 10 from separating from the installation position 3, which relates to the sensor patch 20, as described infra.

The sensor patch 20 may be have various structural configurations, including an embodiment having a band shape elongated in a direction and an embodiment in which the entire (or a portion of) the edge of the sensor patch 20 is a bonding portion. According to the former one, a bonding portion is formed at both ends of a band shape and a pressing portion is formed between the bonding portion, so the sensor module housing 10 is inserted under the pressing portion from a side of the pressing portion. However, it is impossible or difficult to insert the sensor module housing under the pressing portion from a side of the pressing portion, so a sensor insertion hole is formed at a predetermined portion of the sensor patch 20. The former and latter embodiments are described hereafter. FIG. 1 is a cross-sectional view showing both of the band type embodiment and the embodiment with a sensor insertion hole.

First Embodiment—Band Type

Figure 3A:
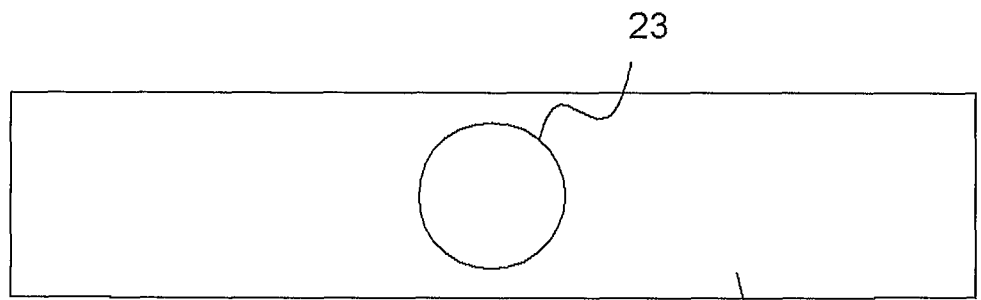
FIGS. 3(a)-3(c) are plan view illustrations of sensor patches, according to embodiments.
Figure 3B:
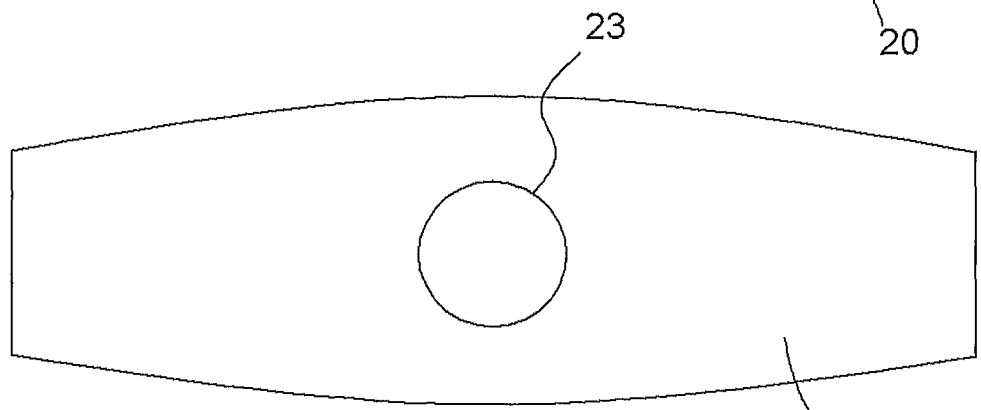
Figure 3C:
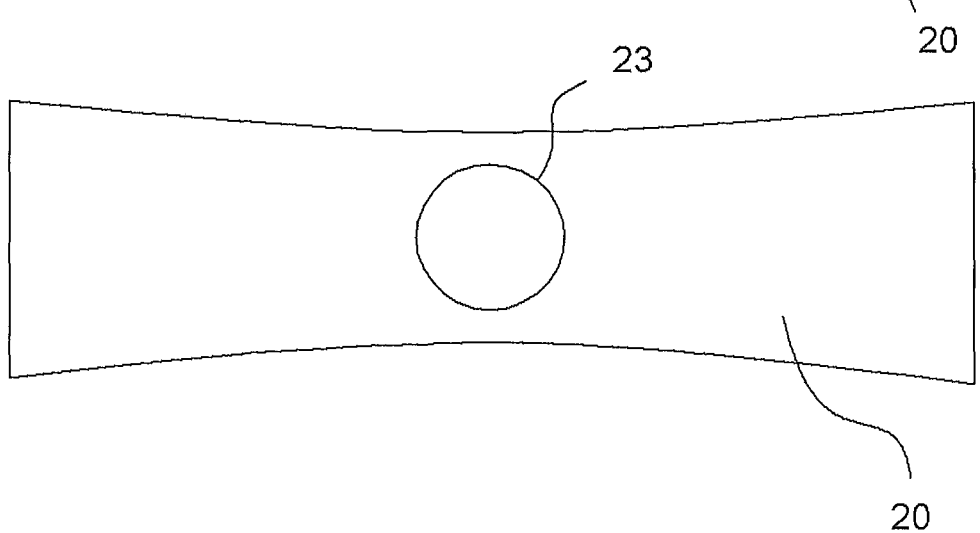

FIGS. 3(a)-3(c) are plan view illustrations of sensor patches, according to embodiments. In the illustrated embodiments, a sensor patch 20 has bonding portions 21 at predetermined portion close to the edge to be coupled to the inner side of a tire and a pressing portion 22 for bringing and keeping the sensor module housing 10 in close contact with an installation position 3. In the sensor patch 20 that is a single member, the portion that is brought in contact with the inner side of a tire may be called the bonding portion 21 and the portion that presses down the sensor module housing 10 by expanding and contracting in contact with the sensor module housing 10 may be called the pressing portion 22 (that is, the portion of the sensor patch 20 except the bonding portion 21 can be called the pressing portion 22). Further, the bonding portion 21 and the pressing portion 22 may be separately formed and then combined with each other.

The sensor patch 20 is supposed to have at least two bonding portions 21 at both sides from the pressing portion 22. That is, the sensor patch 20 of the present disclosure uses flexibility of the pressing portion 22 between the bonding portions 21 at both ends with the bonding portions 21 fixed to the inner side of a tire. In other words, the bonding portions 21 are formed at predetermined portions close to the edge of the sensor patch 20. For example, when the sensor patch 20 has a rectangular (band) shape, the bonding portions 21 may be formed at areas close to the two short sides (both ends of the band), in which the area around the two long sides is not open without being bonded to the inner side of a tire, thereby providing an entrance for inserting the sensor module housing 10.

The sensor patch 20 is made of a flexible material, so the pressing portion 22 may change in length in the extension direction when the sensor module housing 10 is installed (installed state) or when the sensor module housing 10 is not installed yet or has been removed after installed (separated state). The sensor patch 20 is usually made of an elastic material having a unique modulus of elasticity and contraction force is generated in proportion to the changing length in the extension direction (Hook's Law). The contraction force is the pressure applied downward to the top of the sensor module housing 10 by the sensor patch 20 when the sensor module housing 10 is installed.

Still referring to FIGS. 3(a)-3(c), the shape of the sensor patch 20 may include a circle, an ellipse, a rectangle, and other various shapes and the shape of the pressing portion 22 may depend on the shape of the sensor patch 20. In particular, when it is a rectangle, it may be called a band shape. The size of the pressing portion 22 should be determined in consideration of the size of the sensor module housing 10. Further, the difference between the initial length in the extension direction of the pressing portion 22 and the length with the sensor module housing 10 mounted (length after mounting) is also an object to be designed. When the difference is too large, a specific portion of the sensor patch 20 may excessively extend and break, and when the modulus of elasticity of the material of the sensor patch 20 is large, it may be difficult to install the sensor patch 20 because a large force is sometimes used to extend the sensor patch 20. Further, when the elasticity of the material of the sensor patch 20 is small, it may be difficult to install the sensor patch 20.

Figure 6:
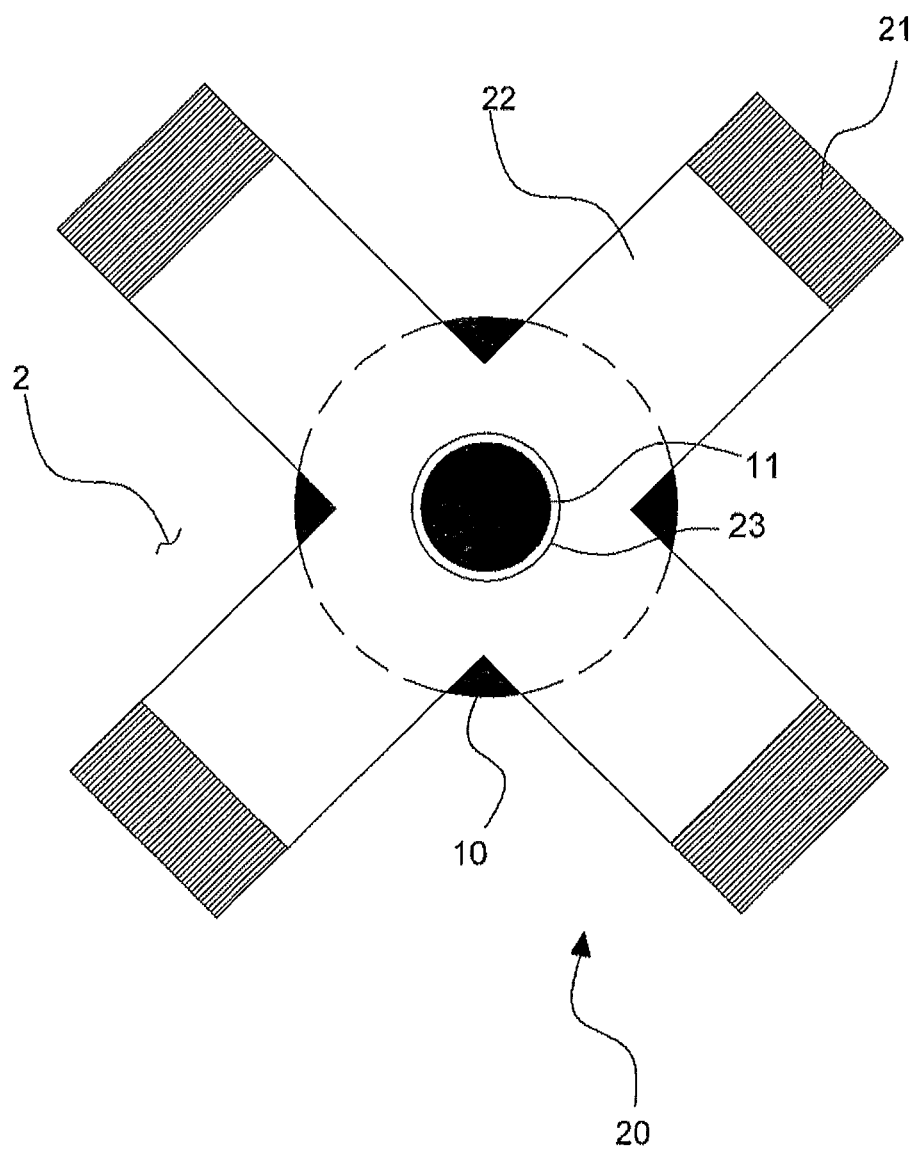
FIG. 6 is a plan view illustration of a tire sensor installation structure having a sensor patch, according to embodiments.
Figure 7:
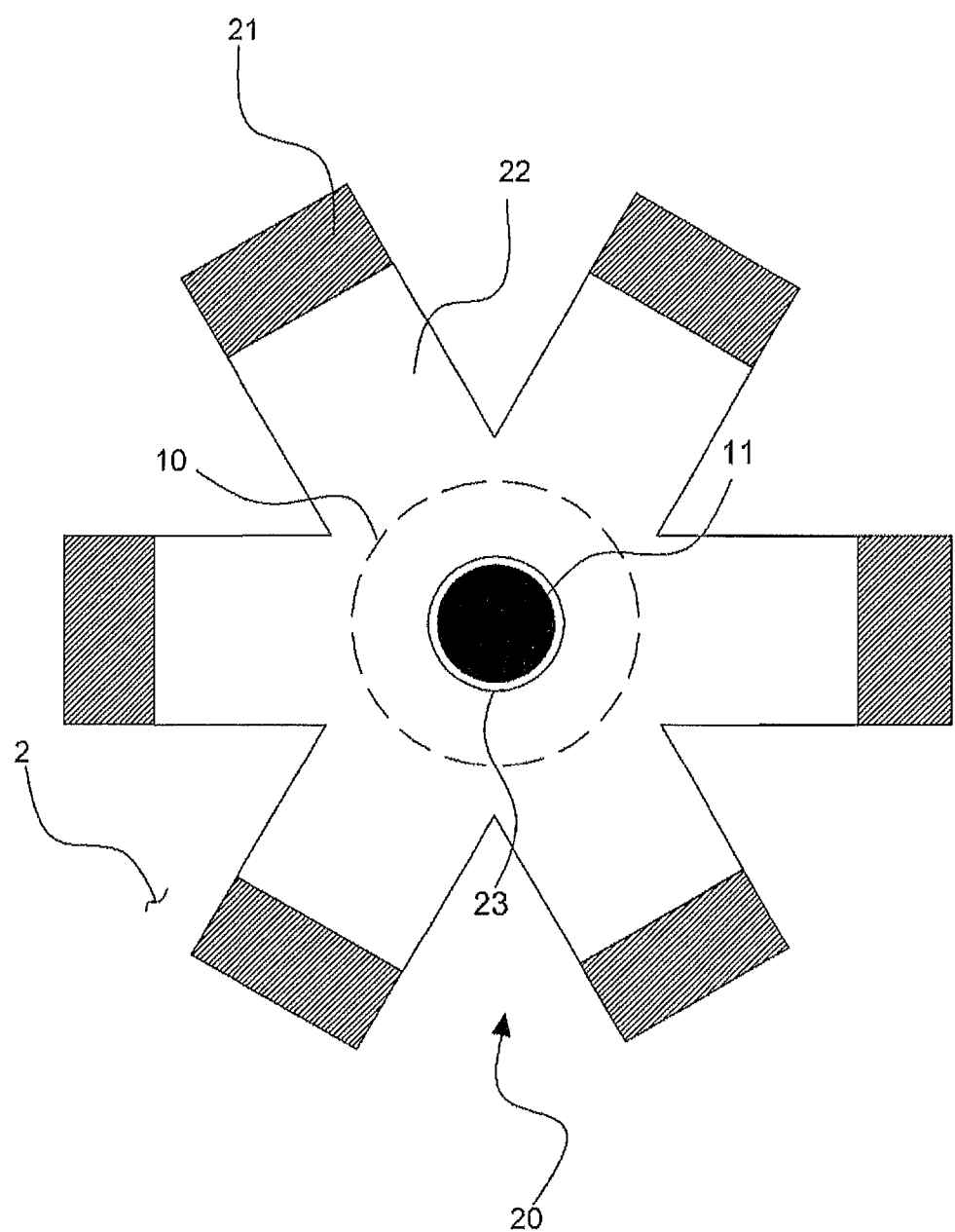
FIG. 7 is a plan view illustration of a tire sensor installation structure having a sensor patch, according to embodiments.

However, referring to FIGS. 6 and 7, the shape of the sensor patch 20 may not be limited to a circle, an ellipse, and a rectangle. Even in those cases, it is apparent that the sensor module housing 10 is inserted through the exposed portion at the sides of the pressing portion 22.

The bonding portion 21 may be formed in various shapes and the size is not limited, but it should be considered that the larger the contact area with the inner side of a tire of the bonding portion 21, the more the coupling force between the inner side of the tire and the sensor patch 20 can be increased, when determining the shape and size. Further, if the pressing portion 22 is increased in size, the bonding portion 21 also should be increased in size.

Referring back to FIG. 1, according to the embodiment shown at the left side, the bonding portion 21 is integrated with the inner side of a tire, so when seen from the outside, there may not be a step between the inner side of the tire and the top of the bonding portion 21 or the step may be smaller than the thickness of the sensor patch 20. This is an embodiment when the sensor patch 20 and the inner side of a tire are coupled by vulcanization, in which the portion that will be the bonding portion 21 before vulcanization is melt and integrated with the inner surface of a tire during vulcanization. Accordingly, it should be understood that the bonding portion 21 exists even in this embodiment.

The thickness of the sensor patch 20 may be designed to be uniform, but if a specific portion further extends than other portions for the structure, the portion may be set thicker, and in contrast, if a specific portion less extends than other portions, the portion may be set thinner.

After the sensor module housing 10 is installed, a normal force is applied to the inner side of the tire by the downward pressure from the sensor patch 20, but the force applied by the sensor patch 20 cannot completely prevent the sensor housing 10 from separating, because the surface of the pressing portion 22 is not in contact with the inner side of the tire. That is, this is because even though the sensor module housing 10 is installed under the sensor patch 20, the sensor module housing 10 can slide with respect to the sensor patch 20 and the installation position 3 if a shock parallel with the inner side of the tire is applied to the sensor module 10. Further, when the sliding displacement is accumulated, the sensor module housing 10 may be finally separated (removed) from the installation point 3.

Accordingly, the present disclosure describes the following configuration to prevent the sensor module housing 10 from laterally separating from the installation position 3. Referring to FIGS. 2 and 4 to 7, the sensor module housing 10 has a fixing projection, e.g., a fixing protrusion, having a predetermined shape on the top, the sensor patch 20 has a fixing hole in which the fixing projection 11 is inserted, and the fixing hole 23 and the fixing projection 11 can be coupled to each other.

Parameters relating to the shape of the fixing projection 11 may be the height and the cross-sectional shape of the fixing projection 11. It should be noted that when the height of the fixing projection 11 is too small, it may be separated from the fixing hole 23 to be described below. The cross-sectional shape of the fixing projection 11 may include various shapes such as a circle, an ellipse, and a (regular) polygon, but it may be a circle, considering easiness of fitting in consideration of the shape of the fixing hole 23 formed in the sensor patch 20. Although the inside of the fixing projection 11 may be an empty space, a structure such as an antenna for the sensor module may be arranged in the space, considering the geometric characteristic that it protrudes outward.

Although the fixing hole 23 may be formed in various shapes, when it has a circular shape and even if the cross-sectional shape of the fixing projection 11 is a circle, an ellipse, and a polygon, it may be possible to receive all of these shapes. The fixing hole 23 is designed to be larger in size than the fixing projection 11, in which a coupling tolerance between the fixing hole 23 and the fixing projection 11 should be considered. Further, since the sensor patch 20 has elasticity, it should be noted that the fixing hole 23 may be enlarged by the downward pressure applied to the top of the sensor module housing 10 by the sensor patch 20.

Figure 4:
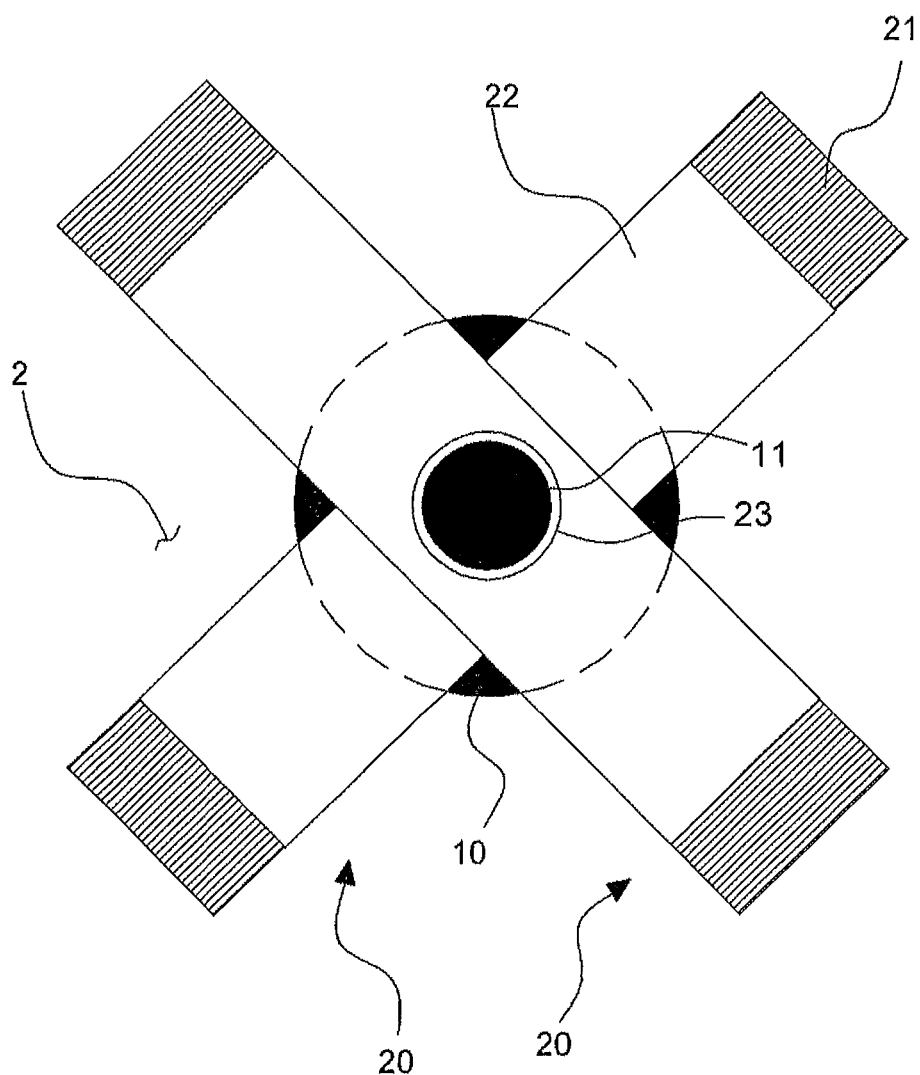
FIG. 4 is a plan view illustration of a tire sensor installation structure having two sensor patches, according to embodiments.
Figure 5:
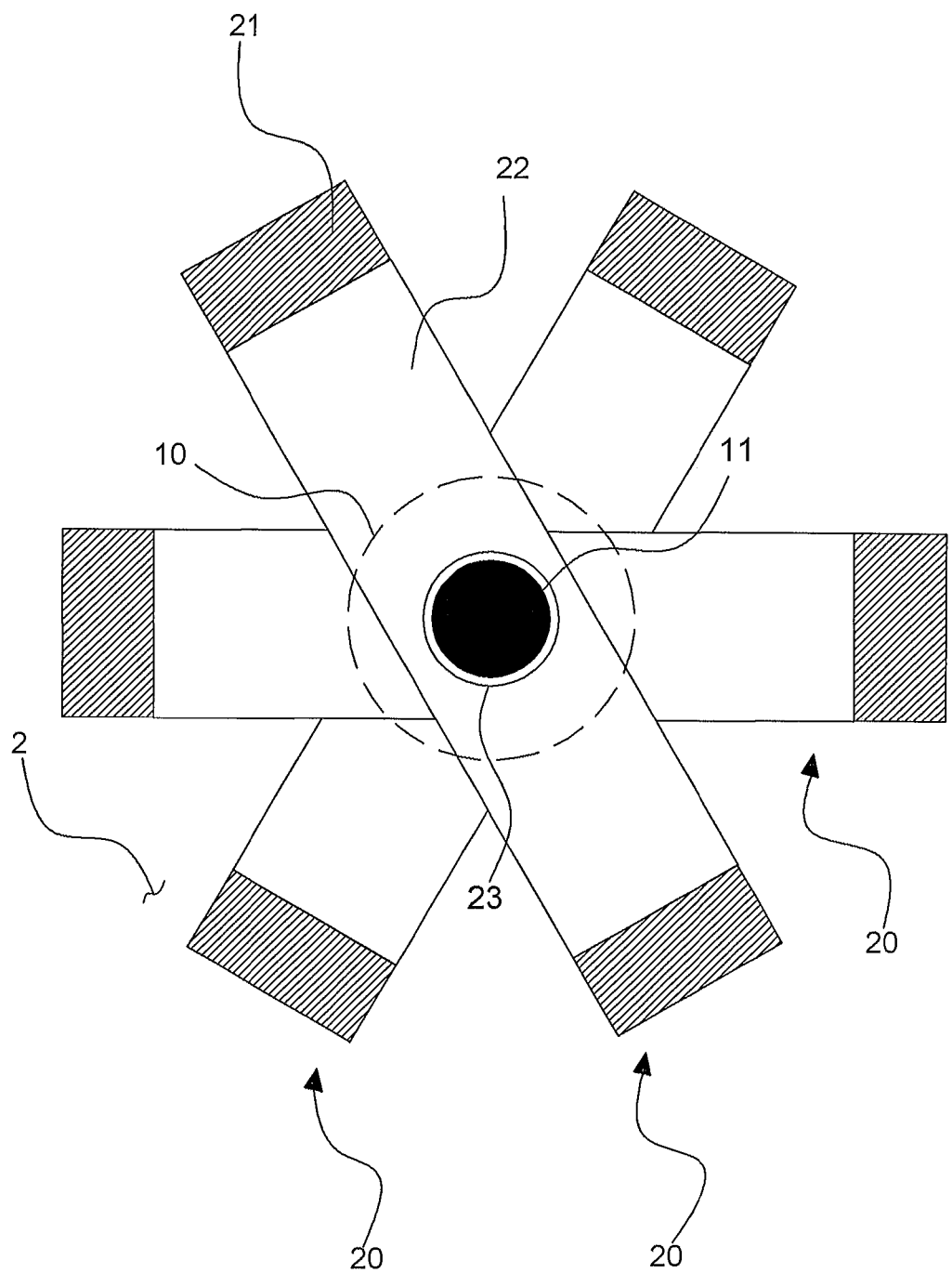
FIG. 5 is a plan view illustration of a tire sensor installation structure having three sensor patches, according to embodiments.

In one tire sensor installation structure installation structure, one or more sensor patches 20 may be provided, and particularly, when two or more sensor patches 20 are provided, the downward pressure that can be applied by the sensor patches 20 is larger, so a sensor module can be more firmly installed. Further, when two or more sensor patches 20 are provided, they may be arranged across each other and the pressing portions 22 may all be arranged over the installation positions 3. Further, when the sensor patches 20 are arranged at the same angles around the installation position 3, it may be easier to secure balance among forces applied to the sensor module housing 10. Referring to FIGS. 4 and 5, when two sensor patches 20 are provided, they are arranged in the shape of '+', and when three sensor patches 20 are provided, they are arranged in the shape of '*', but the present disclosure is not limited thereto.

However, arranging two or more sensor patches 20 with regular intervals in accordance with the shape of the sensor module housing 10 make the sum of rotational moment zero, so it should be considered that the sensor module housing 10 is turned over and separated from the installation position 3 by a shock.

The material of the sensor patch 20 may include one or more homopolymers selected from a group of EVA (Ethylene vinyl acetate), synthetic resin, natural resin, and urethane, or copolymers of monomers of them. Obviously, latex may be used. It is desirable to design the components of the sensor patch 20 such that a predetermined elasticity is maintained.

Referring back to FIG. 1, the tire sensor installation structure of the present disclosure may be formed on the inner surface of a tire, may be formed on the inner side wall of a tire, a rim, or an inner liner, and may be formed on an inner liner 2 of a tire. In this case, the sensor patch 20 may have a thickness of 20~120% of the thickness of the inner liner 2. Considering the thickness of the inner liner 2 of a 16 inch tire is generally 1.5 mm, when it is less than 20%, the sensor patch 20 is too thin, so a problem may occur with the durability, for example, breaking of the sensor module housing 10 when it is inserted. Further, when it is larger than 120%, an increase in weight at a corresponding portion may exceeds an ignorable level when or after the sensor patch 20 is attached, so non-uniform centrifugal force is locally generated, which may cause a problem such as uneven wear of the tire.

Further, when the sensor patch 20 is formed on the inner liner 2, the material of the sensor patch 20 may be the same as that of the inner liner 2, which is determined in consideration that when the sensor patch 20 and the inner liner 2 are combined by particularly vulcanization, as described above, it is possible to maximize the coupling effect even without using a specific adhesive.

Next, a method of manufacturing a tire sensor installation structure of the present disclosure including the process of combining the sensor patch 20 and the inner side of a tire will be described.

The process of combining the bonding portion of sensor patch 20 and the inner side of a tire may be composed of a combining process, a bonding process, or a fusing process. The bonding process uses an adhesive having predetermined components and the fusing process partially melts the bonding portion 21 or a predetermined portion of the inner side of a tire by heating it and then bonding a bonding portion 21 to the predetermined portion inside the tire under pressure. The composition of the adhesive to be used or the melting temperature in the fusing process should be selected differently in accordance with the composition of the inner side of a tire or the composition of the sensor patch 20.

The bonding portion 21 and the inner side of a tire may be combined by vulcanization. Vulcanization is a process of putting a non-vulcanized green tire into a vulcanizing mold, and forming a tire in a predetermined shape and ensuring desired properties of the tire by applying heat and pressure, and can be used to combine the sensor patch 20 and the inner side of a tire (inner liner 2) in the present disclosure.

Before vulcanization, the sensor patch 20 and the inner side of the tire (inner liner 2) may be prepared by physically abutting (non-contact type), but it may be possible to temporarily bond the bonding portion 21 to the inner side of the tire using a predetermined adhesive. Further, it may be possible to put an anti-pressing portion-tire attachment structure 30 under a pressing portion 22 before vulcanization in order to prevent the surface of the pressing portion 22 of a sensor patch 20 and the inner side of a tire from being attached to each other. The anti-pressing portion-tire attachment structure 30 should be made of a high-temperature polymer of which at least the surface is not melted at the temperature for vulcanization.

Figure 11A:
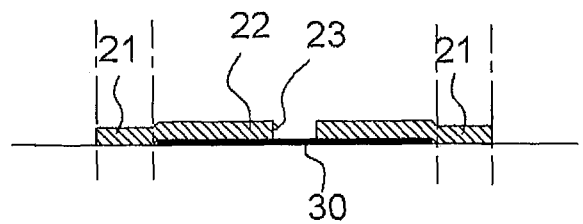
FIGS. 11(a)-11(c) are cross-sectional views illustrating an anti-pressing portion-tire attachment member formed in a film shape, in operation, according to various embodiments, including a band type and a type having a sensor insertion hole.
Figure 11B:
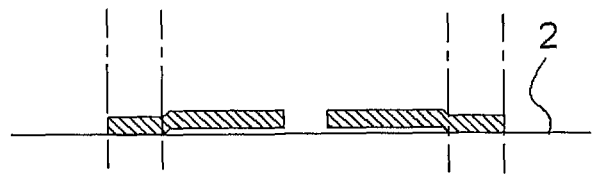
Figure 11C:
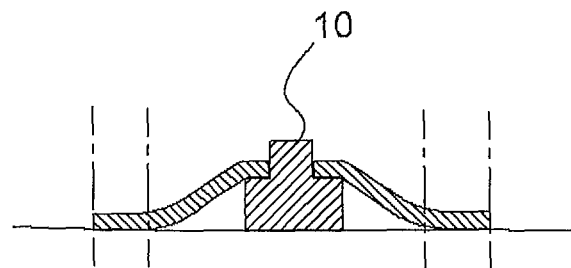
Figure 12A:
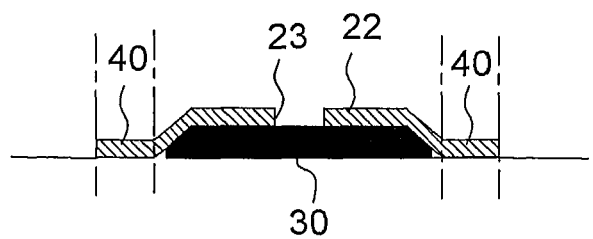
FIGS. 12(a)-12(c) are cross-sectional views illustrating a projective anti-pressing portion-tire attachment member, in operation, according to various embodiments, including a band type and a type having a sensor insertion hole.
Figure 12B:
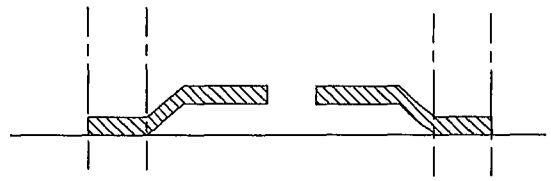
Figure 12C:
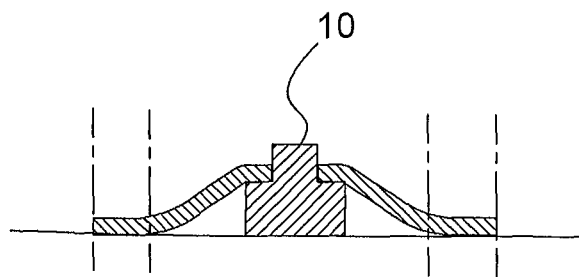

FIGS. 11(a)-11(c) are cross-sectional views illustrating an anti-pressing portion-tire attachment member formed in a film shape, in operation, according to some embodiments, including a band type and a type having a sensor insertion hole. As illustrated, the anti-pressing portion-tire attachment structure 30 may be a thin film, in which it is possible to minimize the initial length of a pressing portion in the extension direction and this embodiment may be applied when a sensor module housing 10 to be used is small in height. Other embodiments are possible. For example, FIGS. 12(a)-12(c) are cross-sectional views illustrating a projective anti-pressing portion-tire attachment member, in operation, according to some other embodiments, including a band type and a type having a sensor insertion hole. In contrast to embodiments illustrated with respect to FIGS. 11(a)-11(c), in FIGS. 12(a)-12(c), when a selected sensor module housing 10 is high, an anti-pressing portion-tire attachment structure 30 having a projective shape with a predetermined height may be used. This is because when the film-shaped anti-pressing portion-tire attachment structure 30 is used, the deformation amount (length) of the pressing portion 22 is too large and the sensor patch 20 breaks or a sensor module housing 10 may not be installed.

The thickness of the anti-pressing portion-tire attachment structure 30 may be 20~50% of the thickness of the sensor patch 20. When the thickness is larger than 50% of the thickness of the sensor patch 20, pressure may be non-uniformly applied in vulcanization, and when it is smaller than 20%, the patch excessively extends when the sensor module housing 10 is inserted, a problem such as breaking may occur.

Further, the anti-pressing portion-tire attachment structure 30 should be removed after the bonding portion 21 of the sensor patch 20 is attached to the inner side of a tire by vulcanization, but it may be removed any time before the sensor module housing 10 is installed.

In short, the process of combining a bonding portion 21 and the inner side of a tire using vulcanization includes a vulcanization-preparing step and a vulcanizing step, and the anti-pressing portion-tire attachment structure 30 is installed between the pressing portion 22 and the inner side of the tire before the vulcanizing step.

A method of using a tire sensor installation structure of the present disclosure is described with reference to FIGS. 1 and 2. The tire sensor installation structure may be used before or after a tire is delivered from a warehouse.

First, the sensor patch 20 is extended upward by applying force to the pressing portion 22. Before this step, a step of applying a permanent- or temporary-fixing adhesive to a portion of the sensor module housing 10 may be further included. The adhesive force of the temporal-fixing adhesive may not need to be strong, but an adhesive with strong adhesive force may be used to permanently fix the sensor module housing 10 to a fixing portion. When an adhesive is additionally applied, the adhesive force of the adhesive can be added to the pressing force by the sensor patch 20, such that the sensor module housing 10 can be more firmly mounted. Further, when two or more sensor patches 20 are provided, all of the sensor patches 20 are extended upward.

Second, the sensor module housing 10 is placed under the pressing portion 22. Since the sides of the pressing portion 22 are open, the sensor module housing 10 is inserted through a side of the pressing portion 22.

Third, the fixing projection 11 of the sensor module housing 10 and the fixing hole 23 of the sensor patch 20 are fitted to each other. Further, when two or more sensor patches 20 are provided, the center of the fixing holes 23 of each of the sensor patches 20 are aligned prior to fitting the fixing projections 11.

Further, the force extending the sensor patch 20 is removed to that the sensor patch 20 contracts and presses downward the sensor module housing 10. Fifth, the sensor patch 20 maintains the sensor module housing 10 in close contact with the inner side of the tire.

Although only one tire sensor installation structure of the present disclosure may be provided to a tire, a plurality of tire sensor installation structures may be provided. In general, the state information of a tire collected from the tire such as lateral force applied to the inner side of the tire and acceleration depends on the lateral position of the tire, so when a plurality of tire sensor installation structures is provided, the tire sensor installation structure may be positioned on a circle connecting one lateral position, but is not limited thereto. Further, when a plurality of tire sensor installation structures is provided, the tire sensor installation structures may be arranged with regular intervals, because the tire sensor installation structures influence the moment of inertia of a tire, so an asymmetric tire sensor installation structure may not secure balance of a tire. When two tire sensor installation structures are provided, they may be arranged at 180 degrees, and when three tire sensor installation structures are provided, they may be arranged at 120 degrees. However, these configurations are limited only to the case when tire installation structures are the same, but even if tire sensor installation structures are the same, they are not necessarily arranged with regular intervals.

Second Embodiment—Type Having a Sensor Insertion Hole

Figure 8A:
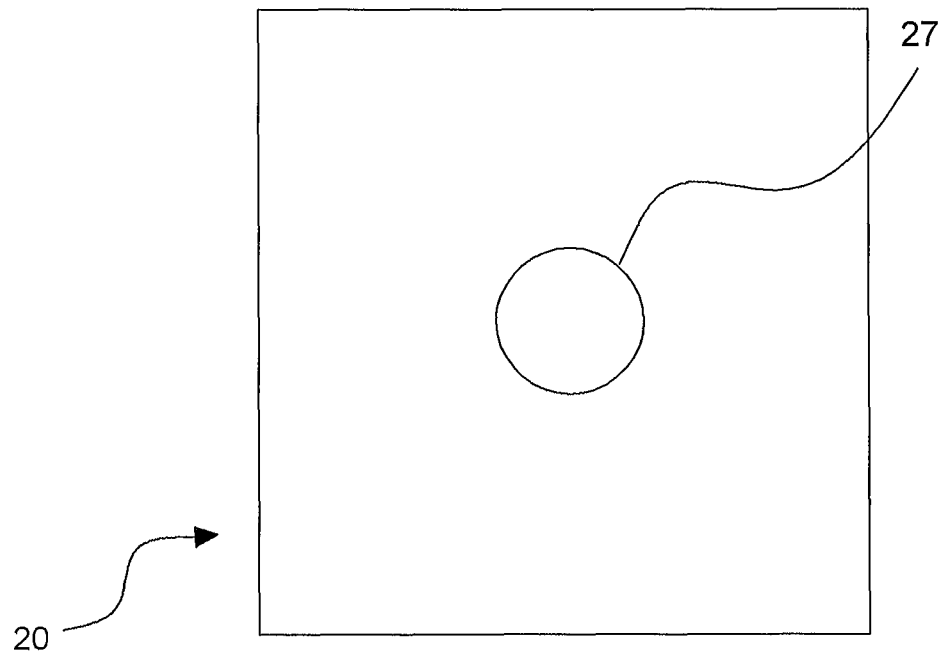
FIGS. 8(a) and 8(b) are plan view illustrations of sensor patch shapes having a sensor insertion hole, according to embodiments.
Figure 8B:
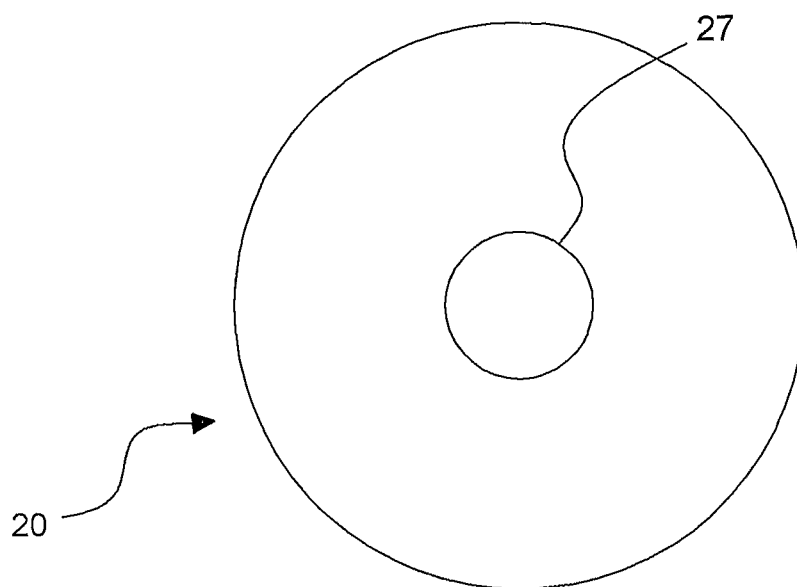

Referring to FIGS. 8(a) and 8(a), a sensor patch 20 may be formed in any one of a circular shape, an elliptical shape, and a polygonal shape, a sensor insertion hole 27 that is expanded and returned to the initial size after the sensor module housing 10 is inserted may be formed at a predetermined position of the pressing portion 22, and the sensor housing module 10 may be fixed in a space defined by the sensor patch 20 and the inner side of the tire.

It is apparent that this embodiment also includes a sensor module housing 10 including a sensor module and one or more sensor patches 20 having a bonding portion 21 that is attached to the inner side of a tire and a pressing portion 22 that brings and maintains the sensor module housing 10 in close contact with an installation position 3, in which the pressing portion 22 presses down the top of the sensor module housing 10 by extending and contracting.

In the sensor patch 20 that is a single member, the portion that is brought in contact with the inner side of a tire may be called the coupling portion 21 and the portion that presses down the sensor module housing 10 by expanding and contracting in contact with the sensor module housing 10 may be called the pressing portion 22 (that is, the portion of the sensor patch 20 except the coupling portion 21 can be called the pressing portion 22). Further, the coupling portion 21 and the pressing portion 22 may be separately formed and then combined with each other.

That is, the sensor patch 20 of the present disclosure uses flexibility of the pressing portion 22 with the bonding portions 21 fixed to the inner side of a tire.

FIGS. 9(a)-10(b) are plan view illustrations of tire sensor installation structures having a sensor insertion hole, according to embodiments. As illustrated, the bonding portion 21 may be formed with a predetermined width around the edge of the sensor patch 20, but may be formed only at a predetermined portion around the edge. The bonding portion 21 may be formed in various shapes and the size (the width) is not limited, but it should be considered that the larger the contact area with the inner side of a tire of the bonding portion 21, the more the coupling force between the inner side of the tire and the sensor patch 20 can be increased, when determining the shape and size. Further, if the pressing portion 22 is increased in size, the bonding portion 21 also should be increased in size.

The sensor patch 20 is made of a flexible material, so the pressing portion 22 may change in area when the sensor module housing 10 is installed (installed state) or when the sensor module housing 10 is not installed yet or has been removed after installed (separated state). The sensor patch 20 is usually made of an elastic material having a unique modulus of elasticity and contraction force is generated in proportion to the changing degree in the extension direction (Hook's Law). The contraction force is the pressure applied downward to the top of the sensor module housing 10 by the sensor patch 20 when the sensor module housing 10 is installed.

The size of the pressing portion 22 should be determined in consideration of the size of the sensor module housing 10. Further, the difference between the initial area of the pressing portion 22 and the area with the sensor module housing 10 mounted is also an object to be designed. When the difference is too large, a specific portion of the sensor patch 20 may excessively extend and break, and when the modulus of elasticity of the material of the sensor patch 20 is large, it may be difficult to install the sensor patch 20 because a large force may be used to extend the sensor patch 20. Further, when the elasticity of the material of the sensor patch 20 is small, it may be impossible to install the sensor patch 20.

Referring back to FIG. 1 (which is a cross-sectional view showing an embodiment having a sensor insertion hole 27), according to the embodiment shown at the left side, the bonding portion 21 is integrated with the inner side of a tire, so when seen from the outside, there may not be a step between the inner side of the tire and the top of the bonding portion 21 or the step may be smaller than the thickness of the sensor patch 20. This is an embodiment when the sensor patch 20 and the inner side of a tire are coupled by vulcanization, in which the portion that will be the bonding portion 21 before vulcanization is melt and integrated with the inner surface of a tire during vulcanization. Accordingly, it should be understood that the bonding portion 21 exists even in this embodiment.

The thickness of the sensor patch 20 may be designed to be uniform, but if a specific portion further extends than other portions for the structure, the portion may be set thicker, and in contrast, if a specific portion less extends than other portions, the portion may be set thinner.

After the sensor module housing 10 is installed, a normal force is applied to the inner side of the tire by the downward pressure from the sensor patch 20, but the force applied by the sensor patch 20 cannot completely prevent the sensor housing 10 from separating out of the installation position, because the surface of the pressing portion 22 is not in contact with the inner side of the tire. That is, even though the sensor module housing 10 is installed under the sensor patch 20, the sensor module housing 10 can slide with respect to the sensor patch 20 and the installation position 3 if a shock parallel with the inner side of the tire is applied to the sensor module 10, so the present disclosure proposes the following configuration to prevent the sensor module housing 10 from separating from the installation position 3.

Figure 10A:
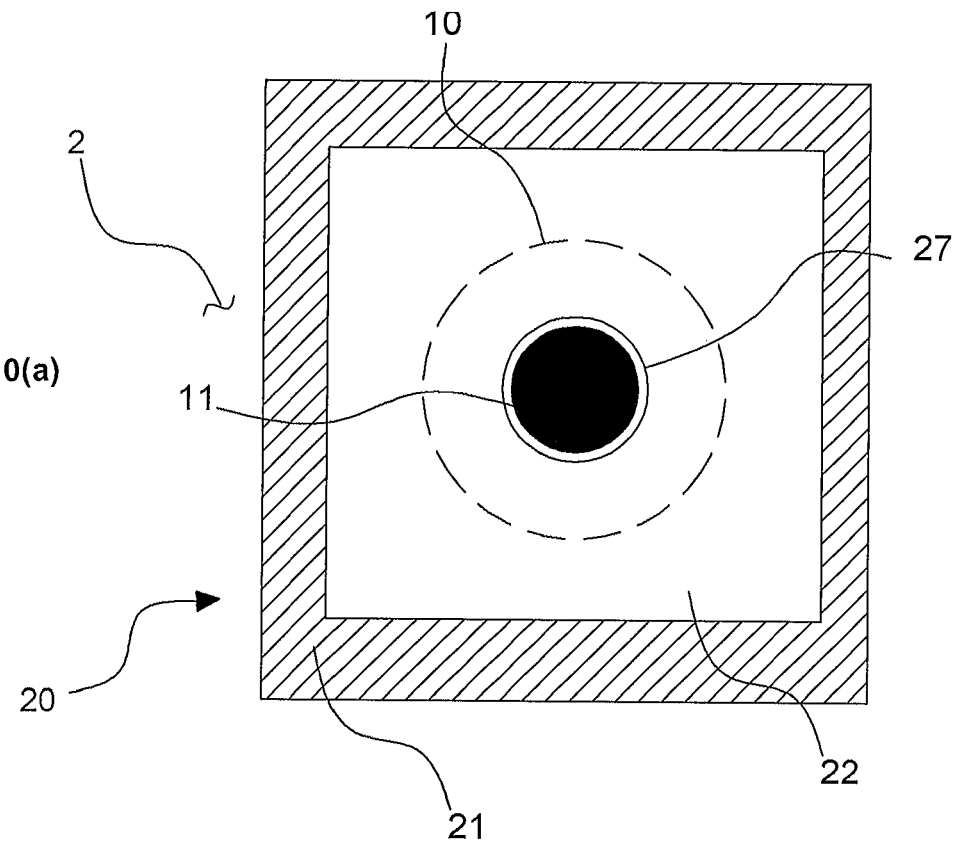
FIGS. 10(a) and 10(b) are plan view illustrations of tire sensor installation structures having a sensor insertion hole, according to embodiments.
Figure 10B:
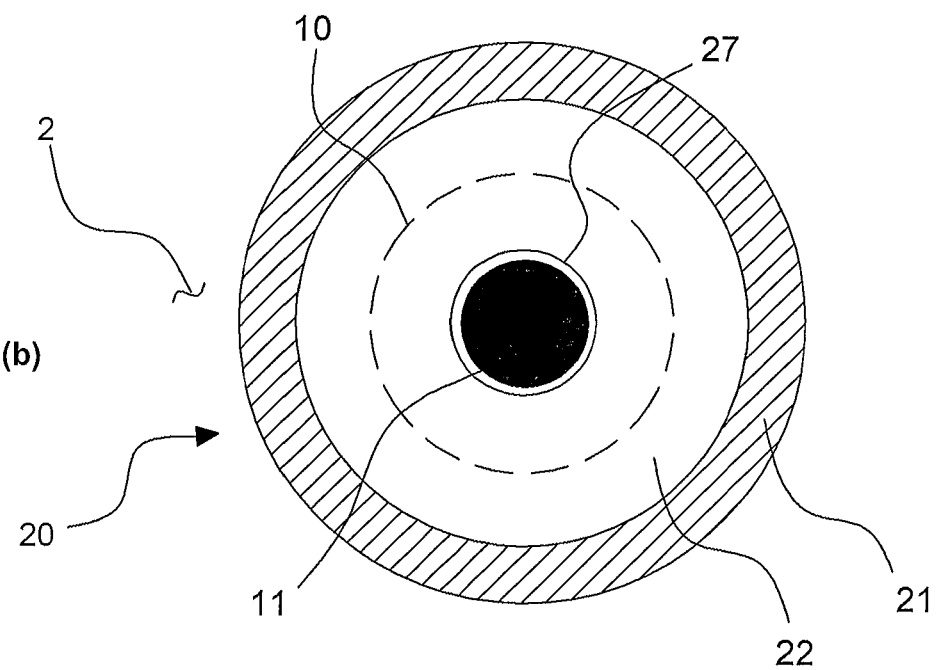

Referring to FIGS. 10(a) and 10(b), the sensor module housing 10 has a fixing projection 11 having a predetermined shape on the top and the sensor insertion hole 27 is fitted o the fixing projection 11 and prevents the sensor module housing 10 from laterally separating from the installation position 3. That is, the sensor insertion hole 27 allows for insertion of a sensor and laterally fixes the sensor module housing 10.

Parameters relating to the shape of the fixing projection 11 may be the height and the cross-sectional shape of the fixing projection 11. It should be noted that when the height of the fixing projection 11 is too small, it may be separated from the sensor insertion hole 27. The cross-sectional shape of the fixing projection 11 may include various shapes such as a circle, an ellipse, and a (regular) polygon, but it may be a circle, considering easiness of fitting in consideration of the shape of the sensor insertion hole 27 formed in the sensor patch 20. Although the inside of the fixing projection 11 may be an empty space, a structure such as an antenna for the sensor module may be arranged in the space, considering the geometric characteristic that it protrudes outward.

Although the sensor insertion hole 27 may be formed in various shapes, when it has a circular shape and even if the cross-sectional shape of the fixing projection 11 is a circle, an ellipse, and a polygon, it may be possible to receive all of these shapes. The sensor insertion hole 27 is designed to be larger in size than the fixing projection 11, in which a coupling tolerance between the sensor insertion hole 27 and the fixing projection 11 should be considered. Further, since the sensor patch 20 has elasticity, it should be noted that the sensor insertion hole 27 may be enlarged by the downward pressure applied to the top of the sensor module housing 10 by the sensor patch 20.

The material of the sensor patch 20 may be at least one or more homopolymers selected from a group of EVA (Ethylene vinyl acetate), synthetic resin, natural resin, and urethane, or copolymers of monomers of them. Obviously, latex may be used. It is desirable to design the components of the sensor patch 20 in order to keep predetermined elasticity.

Referring to FIG. 1, the tire sensor installation structure of the present disclosure may be formed on the inner surface of a tire, may be formed on the inner side wall of a tire, a rim, or an inner liner 2, and may be formed on an inner liner 2 of a tire. In this case, the sensor patch 20 may have a thickness of 20~120% of the thickness of the inner liner 2. Considering the thickness of the inner liner 2 of a 16 inch tire is generally 1.5 mm, when it is less than 20%, the sensor patch 20 is too thin, so a problem may occur with the durability, for example, breaking of the sensor module housing 10 when it is inserted. Further, when it is larger than 120%, an increase in weight at a corresponding portion may exceeds an ignorable level when or after the sensor patch 20 is attached, so non-uniform centrifugal force is locally generated, which may cause a problem such as uneven wear of the tire.

Further, when the sensor patch 20 is formed on the inner liner 2, the material of the sensor patch 20 may be the same as that of the inner liner 2, which is determined in consideration that when the sensor patch 20 and the inner liner 2 are combined by particularly vulcanization, as described above, it is possible to maximize the coupling effect even without using a specific adhesive.

Next, a method of manufacturing a tire sensor installation structure of the present disclosure including the process of combining the sensor patch 20 and the inner side of a tire will be described.

The process of combining the bonding portion 21 of sensor patch 20 and the inner side of a tire may be composed of a combining process, a bonding process, or a fusing process. The bonding process uses an adhesive having predetermined components and the fusing process partially melts the bonding portion 21 or a predetermined portion of the inner side of a tire by heating it and then bonding a bonding portion 21 to the predetermined portion inside the tire under pressure. When attached to each other, the bonding portion 21 and the innter side of the tire are attached through a bonded interface or a fused interface, depending on the attaching process employed. The composition of the adhesive to be used or the melting temperature in the fusing process should be selected differently in accordance with the composition of the inner side of a tire or the composition of the sensor patch 20. Combination is performed in this process, here may not be a step between the inner side of the tire and the top of the bonding portion 21 or the step may be small.

The bonding portion 21 and the inner side of a tire may be combined by vulcanization. Vulcanization is a process of putting a non-vulcanized green tire into a vulcanizing mold, and forming a tire in a predetermined shape and ensuring desired properties of the tire by applying heat and pressure, and can be used to combine the sensor patch 20 and the inner side of a tire (inner liner 2) in the present disclosure.

Before vulcanization, the sensor patch 20 and the inner side of the tire (inner liner 2) may be prepared by physically abutting (non-contact type), but it may be possible to temporarily bond the bonding portion 21 to the inner side of the tire using a predetermined adhesive. Further, it may be possible to put an anti-pressing portion-tire attachment structure 30 under a pressing portion 22 before vulcanization in order to prevent the surface of the pressing portion 22 of a sensor patch 20 and the inner side of a tire from being attached to each other. The anti-pressing portion-tire attachment structure 30 should be made of a high-temperature polymer of which at least the surface does not melt, or undergoes a chemical structural change, at the temperature for vulcanization.

The anti-pressing portion-tire attachment structure 30 may be a thin film, in which it is possible to minimize the initial area of a pressing portion 22 and this embodiment may be applied when a sensor module housing 10 to be used is small in height.

Figure 13A:
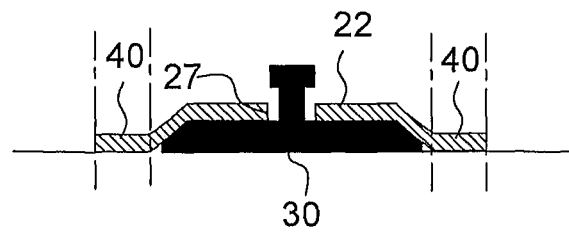
FIGS. 13(a)-13(c) are cross-sectional views illustrating a projective anti-pressing portion-tire attachment structure, in operation, according to embodiments having a sensor insertion hole.
Figure 13B:
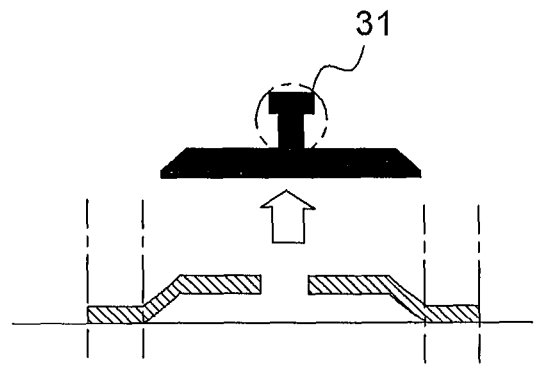
Figure 13C:
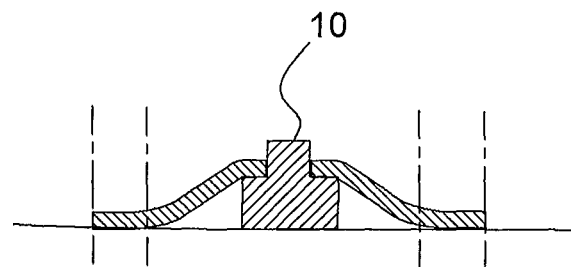

In contrast, referring to FIGS. 13(a)-13(c), when a selected sensor module housing 10 is high, an anti-pressing portion-tire attachment structure 30 having a projective shape with a predetermined height may be used. This is because when the film-shaped anti-pressing portion-tire attachment structure 30 is used, the deformation amount (length) of the pressing portion 22 is too large and the sensor patch 20 breaks or a sensor module housing 10 may not be installed.

The thickness of the anti-pressing portion-tire attachment structure 30 may be 20~50% of the thickness of the sensor patch 20. When the thickness is larger than 50% of the thickness of the sensor patch 20, pressure may be non-uniformly applied in vulcanization, and when it is smaller than 20%, the patch excessively extends when the sensor module housing 10 is inserted, a problem such as breaking may occur.

Further, the anti-pressing portion-tire attachment structure 30 should be removed after the bonding portion 21 of the sensor patch 20 is attached to the inner side of a tire by vulcanization, but it may be removed any time before the sensor module housing 10 is installed. The anti-pressing portion-tire attachment structure 30 is removed through the sensor insertion hole 27, and to this end, as shown in FIG. 13, and it is possible to make an ejector 31 that is integrated with the anti-pressing portion-tire attachment structure 30 and that a user holds and pulls up with a hand when removing the anti-pressing portion-tire attachment structure 30 through the sensor insertion hole 27. However, when the ejector 31 is provided, it should be considered that there is a problem in that the entire thickness of the anti-pressing portion-tire attachment structure 30 increases, thereby causing non-uniform pressure in vulcanization.

In short, the process of combining a bonding portion 21 and the inner side of a tire using vulcanization includes a vulcanization-preparing step and a vulcanizing step, and the anti-pressing portion-tire attachment structure 30 is installed between the pressing portion 22 and the inner side of the tire before the vulcanizing step.

Figure 9A:
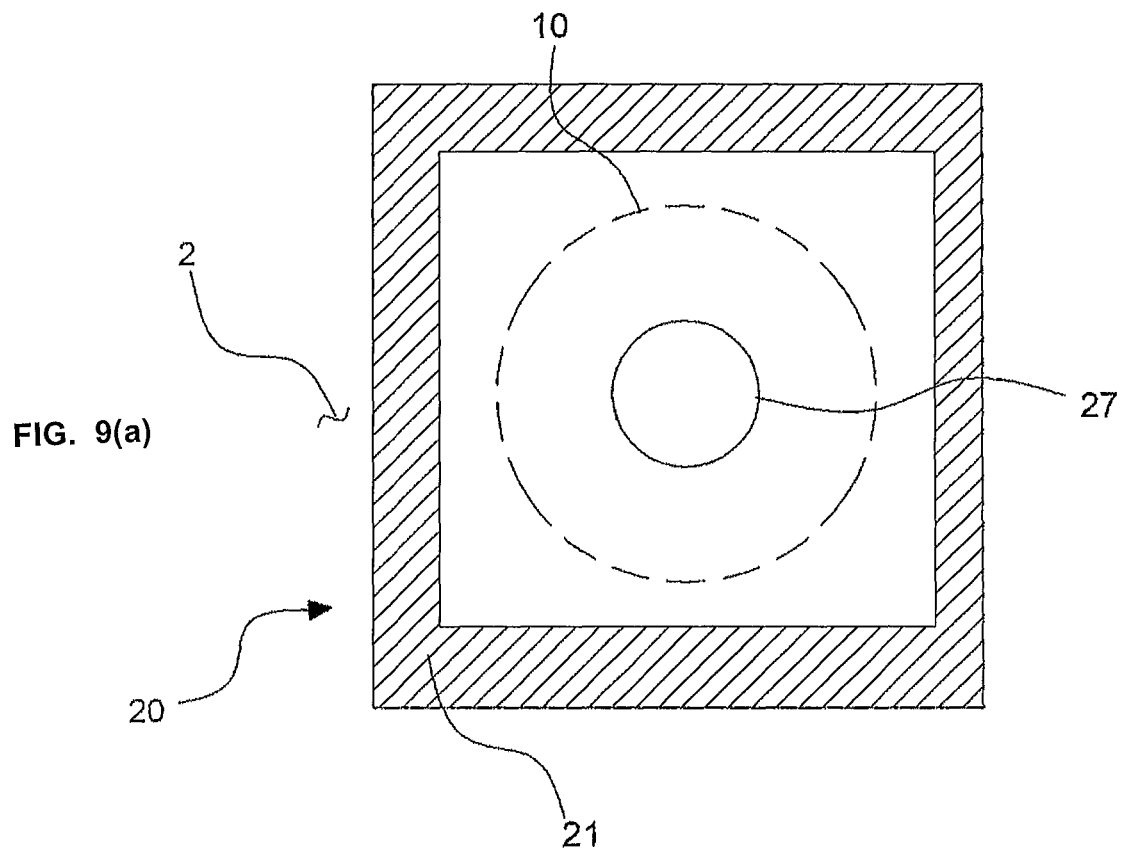
FIGS. 9(a) and 9(b) are plan view illustrations of tire sensor installation structures having a sensor insertion hole, according to embodiments.
Figure 9B:
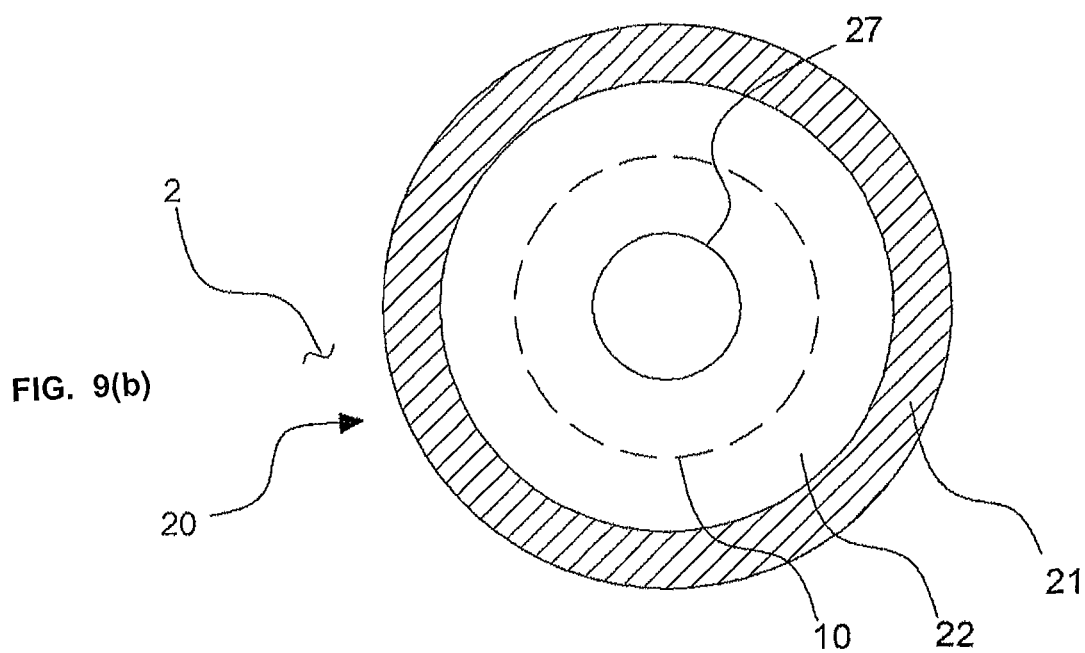

A method of using a tire sensor installation structure of the present disclosure is described with reference to FIGS. 9(a) and 9(b). The tire sensor installation structure may be used before or after a tire is delivered from a warehouse.

First, a user forcibly expands the sensor insertion hole 27. Before this step, a step of applying a permanent- or temporal-fixing adhesive to a portion of the sensor module housing 10 may be further included. The adhesive force of the temporal-fixing adhesive does not need to be strong, but an adhesive with strong adhesive force may be used to permanently fix the sensor module housing 10 to a fixing portion. When an adhesive is additionally applied, the adhesive force of the adhesive is added to the pressing force by the sensor patch 20, so the sensor module housing 10 can be more firmly mounted.

Second, the user puts the sensor module housing 10 under the pressing portion 22 by inserting it through the expanded sensor insertion hole 27. As in the embodiment shown in FIGS. 10(a) and 10(b), when a fixing projection 11 is formed on the sensor module housing 10, the sensor insertion hole 27 of the sensor patch 20 and the fixing projection 11 are fitted to each other.

Third, the user removes the force expanding the sensor insertion hole 27 and pushing up the pressing portion 22 so that the sensor patch 20 contracts and the pressing portion 22 presses down the sensor module housing 10.

Fourth, the user maintains the sensor module housing 10 in close contact with the inner side of the tire with the sensor patch 20.

Although only one tire sensor installation structure of the present disclosure may be provided to a tire, a plurality of tire sensor installation structures may be provided. In general, the state information of a tire collected from the tire such as lateral force applied to the inner side of the tire and acceleration depends on the lateral position of the tire, so when a plurality of tire sensor installation structure is provided, the tire sensor installation structure may be positioned on a circle connecting one lateral position, but is not limited thereto. Further, when a plurality of tire sensor installation structures is provided, the tire sensor installation structures may be arranged with regular intervals, because the tire sensor installation structures influence the moment of inertia of a tire, so an asymmetric tire sensor installation structure may not secure balance of a tire. When two tire sensor installation structures are provided, they may be arranged at 180 degrees, and when three tire sensor installation structures are provided, they may be arranged at 120 degrees. However, these configurations are limited only to the case when tire installation structures are the same, but even if tire sensor installation structures are the same, they are not necessarily arranged with regular intervals.

Although the best mode of the present disclosure is proposed herein, examples for those skilled in the art to accomplish and use the present disclosure are provided to explain the present disclosure. The present disclosure is not limited to the detailed terminologies used herein.

Therefore, although the present disclosure was described in detail with reference to the example, those skilled in the art may change and modify the examples without departing from the scope of the present disclosure. In short, it is not necessary to separately include all of the functions shown in the drawings or follow the orders in the drawings in order to achieve the effects of the present disclosure, and it should be understood that those cases are also included in the scope of the present disclosure described in claims.

According to the present disclosure, it is possible to achieve; a first effect of not damaging the surface of an inner liner when installing a sensor module and of not using an additional process because the sensor installation structure is formed in the process of manufacturing a tire; a second effect of improving workability for installing and removing a sensor module; a third effect of installing a sensor module at various positions and using various sensor modules; and a fourth effect of arranging sensor modules at various positions by making a sensor patch in various shapes such as a band shape of a shape with a sensor insertion hole, and of firmly fixing sensor modules to the inner side of a tire.

What is claimed is:

1. A sensor installation structure configured for installing a sensor module for collecting data associated with a state of a tire at an installation position of an inner side of the tire, the installation structure comprising:
    a sensor module housing configured to accommodate the sensor module; and
    a sensor patch, wherein the sensor patch is a single member comprising:
        a bonding portion formed only at each opposing lengthwise ends of the single member and configured to attach to the inner side of the tire, and
        a pressing portion interposed between the bonding portions and configured to place and maintain the sensor module housing in contact with the inner side of the tire, or an inner liner of the tire when present, at the installation position,
    wherein the pressing portion is configured to apply a downward pressure on a top portion of the sensor module housing by elastically extending and contracting,
    wherein the sensor module housing has a fixing projection having a predetermined shape formed on a top portion thereof, wherein the sensor patch has a fixing hole configured for inserting the fixing projection, and wherein the fixing hole and the fixing projection are configured to be coupled to each other such that the sensor module housing is prevented from laterally separating out of the installation position,
    wherein the sensor patch has a shape selected from the group consisting of a circle, an ellipse and a polygon, and
    wherein each bonding portion has a predetermined width around at least a portion of edges of the sensor patch.

2. The sensor installation structure of claim 1, wherein the fixing hole is formed at a predetermined position of the pressing portion and configured to expand and to be restored to initial dimensions after the sensor module housing is inserted, and
    wherein the sensor module housing is fixed in a space defined by the sensor patch and the inner side of the tire.

3. The sensor installation structure of claim 1, wherein the sensor patch is formed of one or more homopolymers, copolymers or monomers selected from a group consisting of ethylene vinyl acetate (EVA), synthetic resin, natural resin, and urethane.

4. The sensor installation structure of claim 1, wherein the sensor installation structure is formed on the inner liner of the tire.

5. The sensor installation structure of claim 1, wherein the sensor patch has a thickness between about 20% and about 120% of a thickness of the inner liner.

6. The sensor installation structure of claim 1, wherein the sensor patch is formed of the same material as the inner liner.

7. The sensor installation structure of claim 1, wherein each bonding portion and the inner side of the tire are attached to each other using a bonding process or a fusing process such that a bonded interface or a fused interface is formed therebetween.

8. The sensor installation structure of claim 1, wherein the sensor patch is configured to maintain the sensor module housing in direct contact with the inner side of the tire or the inner liner of the tire when present.

9. The sensor installation structure of claim 1, wherein the sensor installation structure comprises a plurality of sensor patches each comprising the pressing portion and the bonding portion, and
    wherein the sensor patches comprise four or more pressing portions that are arranged to have the same angle between adjacent ones thereof around the installation position to secure balance among forces applied to the sensor module.

10. The sensor installation structure of claim 1, wherein each bonding portion and the inner side of the tire are attached by vulcanization such that a vulcanized interface is formed therebetween, and
    an anti-pressing portion-tire attachment structure is provided under the pressing portion before the vulcanization to prevent the surface of the pressing portion and the inner side of the tire from being attached to each other during the vulcanization.

11. The sensor installation structure of claim 10, wherein the anti-pressing portion-tire attachment structure is made of a high-temperature polymer that does not melt at a temperature of the vulcanization.

12. The sensor installation structure of claim 10, wherein the anti-pressing portion-tire attachment structure has a thickness that is between about 20% and about 50% of a thickness of a sensor patch.

13. The sensor installation structure of claim 10, wherein the anti-pressing portion-tire attachment structure has an ejector configured to be held with a hand for easy removal of the anti-pressing portion-tire attachment structure.

14. A method of using two or more sensor patches each according to the sensor patch of the sensor installation structure of claim 1, the method comprising:
    holding up the pressing portion of each of the two or more sensor patches;

placing the sensor module housing under the pressing portion;

coupling the fixing hole with the fixing projection;

releasing the pressing portion of each of the two or more sensor patches such that each of the two or more sensor patches contracts and presses down the sensor module housing; and maintaining the sensor module housing in close contact with the inner side of the tire using each of the two or more sensor patches.

15. A method of using the sensor installation structure of claim 2, the method comprising:
 (a) forcibly expanding the fixing hole;
 (b) inserting the sensor module housing through the fixing hole expanded in the step (a);
 (c) removing the force expanding the fixing hole so that the sensor patch contracts and the pressing portion presses down the sensor module housing; and
 (d) maintaining the sensor module housing in close contact with the inner side of the tire using the sensor patch.

16. A tire comprising one or more of the sensor installation structure of claim 1.

\* \* \* \* \*